Aug. 22, 1933.                I. SHORT                 1,923,280
                             DREDGE PUMP
                     Filed June 4, 1931        2 Sheets-Sheet 1

INVENTOR
IRA SHORT.
BY a. B. Reavis
ATTORNEY

Aug. 22, 1933.  I. SHORT  1,923,280

DREDGE PUMP

Filed June 4, 1931   2 Sheets-Sheet 2

INVENTOR
IRA SHORT.
BY A. B. Reavis
ATTORNEY

Patented Aug. 22, 1933

1,923,280

UNITED STATES PATENT OFFICE 1,923,280

DREDGE PUMP

Ira Short, Essington, Pa., assignor to Westinghouse Electric & Manufacturing Company, a Corporation of Pennsylvania Application June 4, 1931. Serial No. 542,173

4 Claims. (Cl. 137—158)

My invention relates to a combined centrifugal pump, reduction gear and prime mover installation and it has for an object to provide an installation of this character which is compact, simple and economical to construct and install.

Heretofore, with centrifugal pumps, particularly pumps of the dredge type, it has been the practice to embody the pump, reduction gearing, turbine, and yieldable coupling as separate and distinct elements, the pump, the gearing and the turbine being arranged in separate housings and these elements being spread out or separated. In accordance with my present invention, all of the parts referred to are carried by a single frame which embodies pump and gear housings. The runner in the pump housing is connected to a runner shaft supported entirely by bearings carried by the opposed walls of the reduction gear housing, and a gland is carried by one side wall of the pump housing and fits the shaft to prevent leakage from the pump housing. The reduction gearing in the gear housing extends laterally of the runner shaft and it embodies a driven gear journalled on the runner shaft and a pinion member. A yielding coupling connects the driven gear to the runner shaft and a prime mover is supported by the gear housing and it is connected to the pinion member. A thrust bearing is carried by the frame at the side of the gear housing remote from the pump and cooperates with the runner shaft to resist end thrust imposed on the latter. A further object of my invention is, therefore, to provide a pump installation having these advantageous features of construction and operation.

A further object of my invention is to provide a prime mover, gear and pump installation embodying connected pump and gear casings, the gear casing having aligned bearings for supporting the runner shaft and the runner, and the pump casing having side wall openings coaxial with the bearings to facilitate manufacture and assembly of the apparatus.

A further object of my invention is to provide a centrifugal pump driven by reduction gearing embodying a driven gear having a journal fit on the pump runner shaft together with flexible and shearable coupling means between the driven gear and the pump runner shaft.

A further object of my invention is to provide a centrifugal pump driven by reduction gearing operated by a suitable prime mover together with controlling apparatus for the prime mover responsive to predetermined angular movement between the driven gear of the gearing and the pump runner shaft in order to cut off or diminish the supply of energy to the prime mover.

A further object of my invention is to provide a pump, reduction gear and prime mover arrangement having a unitary housing structure providing for a compact installation and constructed and arranged to facilitate manufacture and assembly.

These and other objects are effected by my invention as will be apparent from the following description and claims taken in accordance with the accompanying drawings, forming a part of this application, in which:

Figure 2:
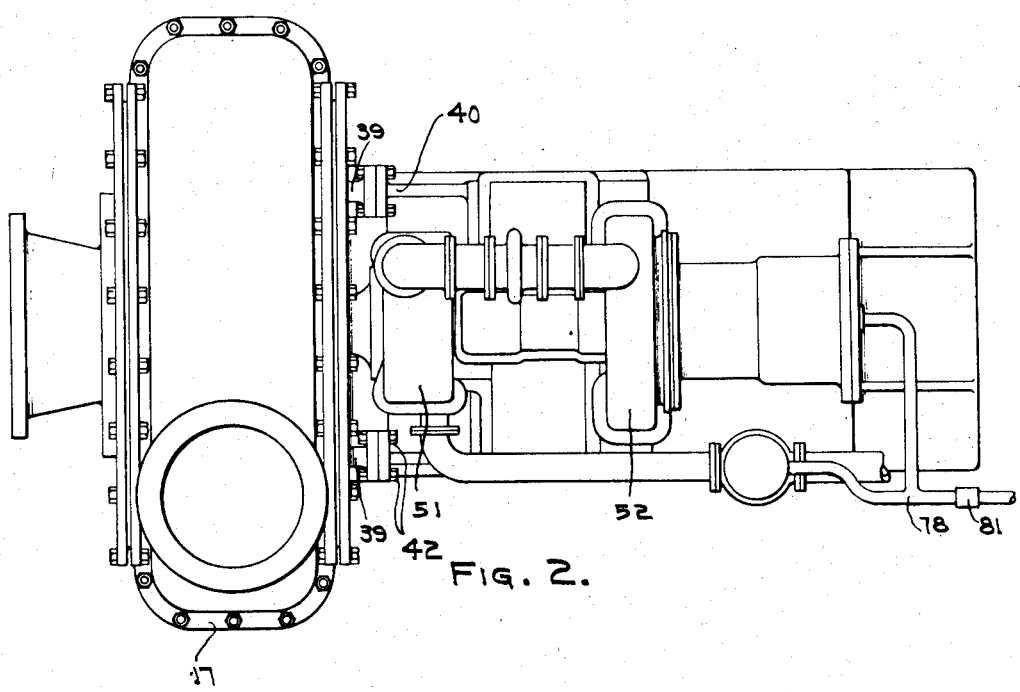
Fig. 2 is a plan view of apparatus shown in Fig. 1.

Referring now to the drawings more in detail, I show a frame 10 embodying a pump housing 11 and a reduction gear housing 12. A centrifugal pump runner 13 is arranged in the pump housing 11 and it is connected to the overhanging end of the runner shaft 14.

Figure 1:
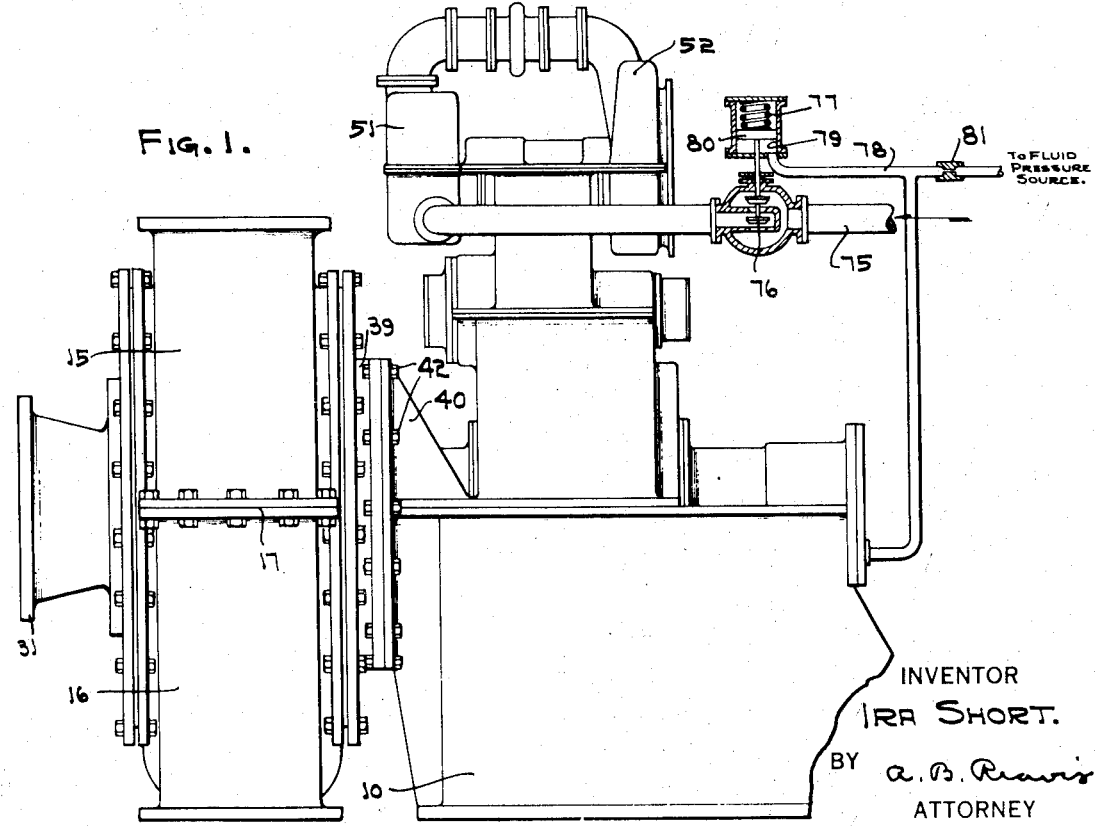
Fig. 1 is a side elevation of my improved pump installation.
Figure 3:
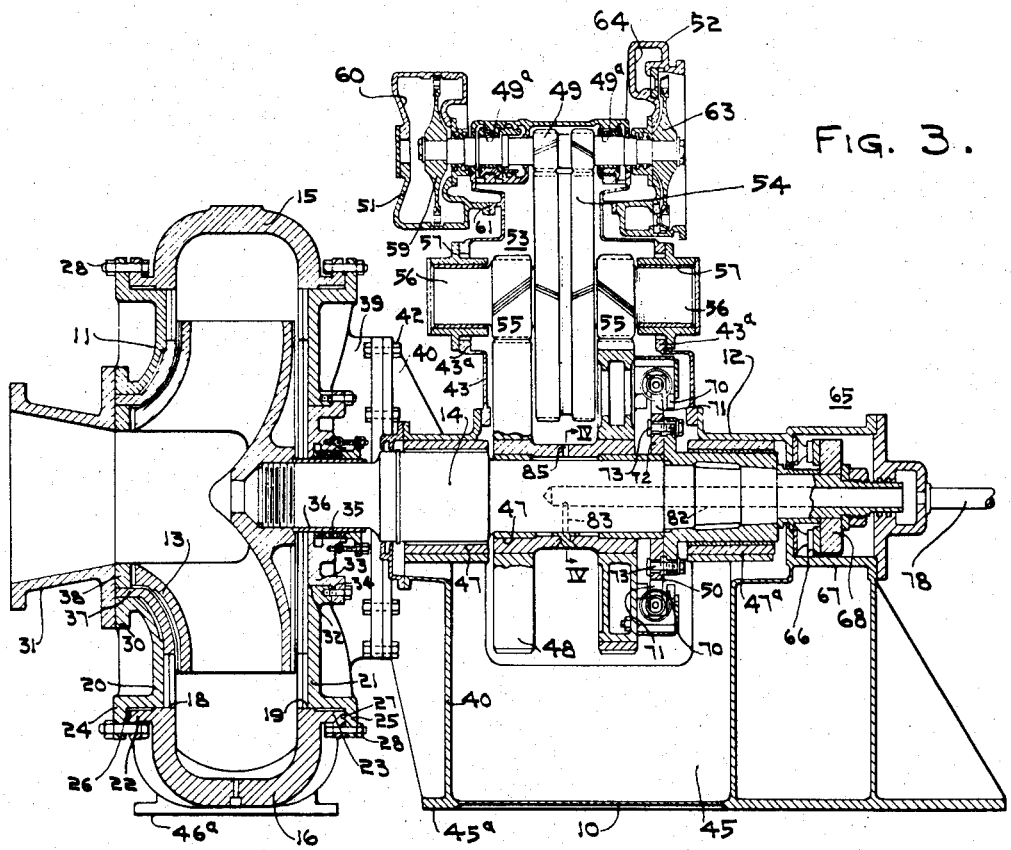
Fig. 3 is a vertical longitudinal sectional view of my improved pump installation; and, Fig. 4 is a detail sectional view taken along the line IV—IV of Fig. 3.
Figure 4:
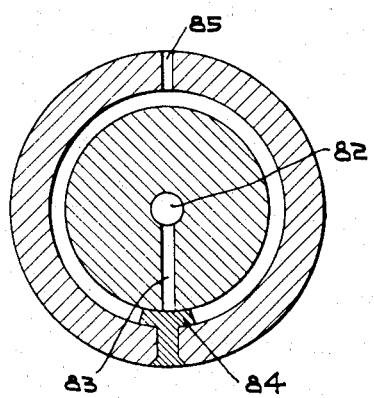

The pump housing 11 embodies an upper part 15 and a lower part 16, connected horizontally, as shown, at 17, in Figs. 1 and 2. The upper and lower parts 15 and 16 define front and back side openings 18 and 19 (Fig. 3) within which fit the front and back wall members 20 and 21, respectively, the annular casing construction comprising the upper and lower members 15 and 16 being provided with outwardly-extending cylindrical cuff portions 22 and 23 which cooperate with radial flanges 24 and 25 carried by the side wall members 20 and 21, respectively. Packing at 26 and 27 assures tight joints and draw bolts 28 cooperate with the flanges 24 and 25 and the sleeve portions 22 and 23 to compress the packing to maintain fluid-tight fits of the side wall portions 20 and 21.

The outer side wall 20 is provided with a cylindrical radial flange 30 to which the inlet conduit 31 is connected. The inner wall 21 has a cylindrical opening 32 receiving the gland housing 33 connected to the end wall 21 by bolts 34. The gland housing includes a suitable compression gland construction 35 which fits a bushing 36, preferably made of non-corrosive material and carried by the runner shaft 14. Also, the front wall member 20 is provided with a liner 37 and a distance ring 38.

The inner or back side wall 21 is provided with bracket portions 39 disposed at either side of the runner shaft 14, as may be seen from Fig. 2. The gear housing 12 is provided with bracket portions 40 connected to the bracket portions 39 by connecting bolts 42. The brackets are relatively wide vertically to give stiffness vertically; and, by having two sets of brackets of suitable strength adequate horizontal stiffness is provided. Hence, it is assured, as hereinafter pointed out, that the pump and gear housings are sufficiently rigid that alignment will be maintained.

As shown, the gear housing 12 is made up of a base part 45 having a lower supporting surface 45a horizontally aligned with the lower supporting surface 46a of the pump housing. The lower portion 45 of the gear housing is connected horizontally in the plane of the runner shaft axis 14 to the upper casing portion 43. The upper and lower casing portions 43 and 45 enclose and support runner shaft bearings 47 and 47a. It will, therefore, be seen that the runner shaft 14 and the runner 13 carried thereby are entirely supported by the bearings 47 and 47a, that is, the runner overhangs the bearing 47 and is disposed in the pump housing 11.

Coaxial relation of the gland 35 and of the bearings 47 and 47a is assured. Assuming that the runner shaft 14 is in place with respect to the bearings 47 and 47a with the forward overhanging end extending through the gland, then the brackets 39 and 40 are connected, the brackets 39 and 40 and the connecting bolts being constructed and arranged to provide for coaxial relation of the gland and the bearings when the brackets are connected. As the pump casing front and back openings 18 and 19, the front and back wall elements 20 and 21 and the gland housing 33 are circular, these parts may be readily constructed to be coaxial and the brackets 39 and 40 may readily have the bolt openings or fastening expedients thereof formed so that all of these parts are coaxial with the main bearings 47 and 47a carried by opposed walls of the gear housing. After the brackets are connected, the runner is connected to the runner shaft end, the front opening 18 being larger than the runner to permit of passage of the runner therethrough incident to attaching or removing the runner. With the runner secured to the runner shaft, the front wall element 20 is secured in position.

Referring now to the reduction gearing more in detail it will be seen that the upper portion or cover 43 of the gear housing extends upwardly and laterally relative to the runner shaft 14. Reduction gearing is embodied in the housing and it includes a driven gear 48 journalled on the runner shaft and a driving pinion 49 carried by suitable bearings 49a connected to the upper housing part 43. The driven gear 48 of the reduction gear is connected to the runner shaft by means of a yieldable coupling 50 of any suitable character and the pinion 49 is driven by suitable prime mover means, indicated at 51 and 52, carried by the upper casing part 43.

Preferably, in order to obtain a high speed reduction, an intermediate gear member, at 53, is interposed between the pinion 49 and the driven gear 48, the intermediate gear member including a gear portion 54 meshing with the pinion 49 and pinion portions 55 meshing with the driven gear 48. The intermediate gear, at 53, is provided with journals 56 carried by bearings 57 supported by end walls 43a of the upper portion or cover 43 of the gear housing. The upper portion or cover 43 has its end walls 43a, immediately above the bearing covers, located in close proximity to the driven gear 48 to minimize the bearing span for the intermediate gear member and the pinion and to increase the rigidity of the cover.

As shown, the prime mover means carried by the gear housing for operating the reduction gearing takes the form of steam turbines, the prime mover, at 51, including a turbine rotor 59 connected to the end of the pinion shaft or spindle overhanging the adjacent bearing 49a and arranged in the housing 60 connected to the gear housing 43, as shown at 61. Likewise, the prime mover, at 52, embodies a turbine rotor 63 connected to the other overhanging end of the pinion spindle or shaft and arranged in a housing construction 64 connected to the reduction gear housing. The prime movers or turbines, at 51 and 52, are arranged in compound relation, that is, steam is first supplied to the blading of the turbine rotor 59 and the exhaust therefrom is supplied to the prime mover or turbine 52 to operate the rotor 63, from which the exhaust goes to the atmosphere or a condenser (not shown). It will be understood that, if desired, a single prime mover or turbine may be employed.

The base construction 45 of the reduction gearing is reenforced to give rigidity and to provide for support of the gearing and of the bearings including the thrust bearing, at 65, the base member being elongated sufficiently for this purpose.

The thrust bearing, at 65, is of a well known type and it embodies thrust shoes 66 supported by the housing 67 connected to the reduction gear housing, the shoes cooperating with a collar 68 carried by the runner spindle 14.

The yieldable coupling 50 already referred to connects the driven gear 48 to the pump runner shaft 14 and it incorporates flexible and shearable elements. The flexible portion of the coupling preferably consists of interfitting lugs or projections 70 and 71 carried by the gear 48 and by the spider 72, respectively, the spider being connected to the runner shaft 14 through the intermediary of shearable pins 73. In operation, shocks or pulsations are taken care of by the flexible coupling elements. If the pump should be overloaded for any reason, for example, by an obstruction tending to stop it, the pins 73 will shear off and avoid breakage of any of the apparatus.

When the prime mover is unloaded on account of shearing of the shear pins, control apparatus is rendered effective to diminish or cut off the supply of energy to the prime mover. As shown, the steam admission line 75 for the turbine apparatus is provided with a stop valve 76, the latter being biased in the closing direction by any suitable means, for example, by a spring 77, and it is held open by fluid pressure, the pressure fluid being supplied by a line 78 to a cylinder 79 within which is arranged a piston or abutment 80 connected to the valve 76. As long as the force of the fluid pressure exceeds that of the spring 77, the valve 76 is held open.

The fluid pressure line 78 is preferably supplied with fluid under pressure from any suitable source through an orifice 81. The line 78 communicates with an axial passage 82 provided in the runner shaft 14, the passage 82 communicating with a radial passage 83 of the shaft within the hub of the driven gear 48. The passage 83 is normally covered by a slide valve portion 84 when the shear pins are in connecting position and this slide valve portion has sufficient arcuate extent to maintain the passage closed within the capacity of yield of the springs of the coupling; however, in case of excessive relative angular movement of the driven gear 48 with respect to the runner shaft 14, the valve portion 84 will uncover the radial passage 83 resulting in the escape of fluid, the latter passing into the space between the shaft and the gear hub and escaping through ports or passages 85. The supply orifice 81 assures of sufficient flow to maintain the valve 76 open and to make up for any leakage; however, in case of release of pressure occasioned by opening of the radial passage 83, the orifice 81 is incapable of supplying fluid at a rate sufficient to maintain the required pressure to hold the valve 76 open and consequently the latter closes. While control apparatus has been specifically described for cutting off the admission of motive fluid to a turbine, it is to be understood that my invention comprehends any suitable controlling system responsive to excessive relative angular movement between the driven gear and the pump runner shaft to diminish or cut off the supply of energy to the prime mover operating the reduction gearing.

From the foregoing, it will be seen that I have provided a combined centrifugal pump, reduction gear and prime mover installations wherein all of the component parts are embodied in a single frame, the frame including pump and reduction gear chambers and the reduction gear casing portion supporting the prime mover or turbine. The reduction gear casing structure and the pump casing structure are so connected, constructed and arranged that the runner shaft is supported entirely by bearings connected to opposed end walls of the gear casing and the pump housing has circular openings at either side and rather substantial side walls, this construction of pump casing side walls facilitating manufacture and assembly. Aside from the simplicity of this organization from the point of view of having the pump runner supported by the reduction gear bearings, it will be seen that the reduction gear occupies a minimum of space longitudinally as the gearing extends laterally and upwardly from the runner shaft, compactness being carried further by having the prime mover turbine connected to and forming a part of the gear casing. In other words, I have provided a pump driven from the turbine through reduction gearing wherein all moving parts are carried by the reduction gear housing and the length of the installation does not greatly exceed that of the reduction gear housing itself. A further advantage of this arrangement of dredge pump is that the complete installation may be manufactured and the parts correctly related before installation on board the dredge, the operating parts will be operatively aligned or related and the installation as a whole will occupy a minimum of space.

Shocks or pulsations are taken care of by the flexible coupling whereby such shocks or pulsations are not imposed to any substantial extent upon the gearing. In case of an obstruction entering the pump and stopping the latter, the shear pins will shear off permitting the driven gear to rotate freely on the runner shaft; and, as the prime mover would be unloaded when the driven gear is free to rotate on the runner shaft, controlling apparatus is rendered effective to diminish or to shut off the supply of energy to the prime mover.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. The combination with a driven machine and a prime mover, said driven machine including a drive shaft, of gearing for transmitting power from the prime mover to the drive shaft and including a driven gear journaled on the latter, coupling means connecting the driven gear and the drive shaft and providing for a normal range of angular movement of the driven gear relative to the drive shaft and effective to disconnect the driven gear from the drive shaft when a predetermined load is exceeded, means for interrupting the supply of energy medium to the prime mover, biasing means for rendering the interrupting means effective, fluid pressure means opposing the biasing means to render the interrupting means ineffective and including a passage formed in the drive shaft and having an open end, and a slide valve element carried by the gear and closing the open end of said passage with sufficient overlap to provide for said normal range of angular movement of the driven gear relative to the drive shaft but exposing the open end to relieve the fluid pressure when said normal range of angular movement is exceeded in consequence of disconnection of the driven gear from the drive shaft in order that said interrupting means may be rendered effective.

2. The combination with a driven machine and a prime mover, said driven machine including a drive shaft, of gearing for transmitting power from the prime mover to the drive shaft and including a driven gear coaxially-arranged with respect to the drive shaft, means for interrupting the supply of energy medium to the prime mover, biasing means for rendering the interrupting means effective, fluid-pressure means opposing the biasing means to render the interrupting means ineffective, a coupling for connecting the driven gear and the drive shaft and providing for relative angular movement of the driven gear with respect to the drive shaft when a predetermined load is exceeded, and means responsive to said relative angular movement of the driven gear with respect to the drive shaft for relieving the pressure of the fluid-pressure means to render said interrupting means effective.

3. The combination with a driven machine and a prime mover, said driven machine including a drive shaft, of gearing for transmitting power from the prime mover to the drive shaft and including a driven gear arranged coaxially of the latter, means for interrupting the supply of energy medium to the prime mover, biasing means for rendering the interrupting means effective, fluid-pressure means opposing the biasing means to render the interrupting means ineffective, a frangible coupling between the driven gear and the drive shaft, and means responsive to relative angular movement of the driven gear with respect to the drive shaft in consequence of yielding of the frangible coupling to relieve the pressure of said fluid-pressure means to render the interrupting means effective.

4. The combination with a driven machine and an elastic fluid operated prime mover, said driven machine including a drive shaft and the prime mover having an elastic fluid-supply passage, of gearing for transmitting power from the prime mover to the drive shaft and including a driven gear arranged coaxially with respect to the latter, a valve arranged in said elastic fluid-supply passage, biasing means for closing the valve, fluid-pressure means opposing the biasing means and normally maintaining the valve open, a coupling for connecting the driven gear and the drive shaft and providing for relative angular movement thereof when a predetermined load is exceeded, and means responsive to angular movement of the driven gear with respect to the drive shaft when the predetermined load is exceeded for relieving the pressure of said fluid-pressure means so that the biasing means may close the valve.

IRA SHORT.